United States Patent
Matsunami et al.

(10) Patent No.: US 7,549,286 B2
(45) Date of Patent: Jun. 23, 2009

(54) EXHAUST EMISSION CONTROL DEVICE

(75) Inventors: Munetomo Matsunami, Hino (JP); Hiroshi Funabashi, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 176 days.

(21) Appl. No.: 11/569,132

(22) PCT Filed: May 24, 2004

(86) PCT No.: PCT/JP2004/007078
§ 371 (c)(1),
(2), (4) Date: Nov. 15, 2006

(87) PCT Pub. No.: WO2005/113951
PCT Pub. Date: Dec. 1, 2005

(65) Prior Publication Data
US 2008/0229732 A1    Sep. 25, 2008

(51) Int. Cl.
*F01N 3/00* (2006.01)
(52) U.S. Cl. .............. 60/297; 60/295; 60/299; 60/303; 60/311; 60/324
(58) Field of Classification Search ............... 60/286, 60/295, 297, 299, 300, 303, 309, 311, 324
See application file for complete search history.

(56) References Cited

U.S. PATENT DOCUMENTS

| | | | |
|---|---|---|---|
| 3,802,163 A | | 4/1974 | Riojas |
| 4,899,540 A | * | 2/1990 | Wagner et al. ............ 60/274 |
| 5,121,601 A | * | 6/1992 | Kammel .................... 60/275 |
| 5,207,990 A | * | 5/1993 | Sekiya et al. .............. 422/183 |
| 6,520,286 B1 | * | 2/2003 | Frederiksen et al. ........ 181/256 |
| 6,660,068 B1 | * | 12/2003 | Garner et al. ............... 95/283 |
| 6,989,045 B2 | * | 1/2006 | Bailey et al. ............... 95/129 |
| 7,051,521 B2 | * | 5/2006 | Funabashi .................. 60/297 |

FOREIGN PATENT DOCUMENTS

| | | |
|---|---|---|
| JP | 63 119817 | 8/1988 |
| JP | 3 64613 | 3/1991 |
| JP | 4 86314 | 3/1992 |
| JP | 2003-83036 | 3/2003 |
| JP | 2003 106139 | 4/2003 |
| JP | 2003 155915 | 5/2003 |
| JP | 2003 214136 | 7/2003 |
| JP | 2003 222040 | 8/2003 |
| JP | 2003 293746 | 10/2003 |

* cited by examiner

*Primary Examiner*—Binh Q Tran
(74) *Attorney, Agent, or Firm*—Oblon, Spivak, McClelland, Maier & Neustadt, P.C.

(57) ABSTRACT

Sensing accuracy of a temperature sensor is enhanced so as to accurately conduct regeneration control of a particulate filter.

Disclosed is an exhaust emission control device wherein a pair of dispersion plates 10 and 11 with a number of communicating holes 10a and 11a are arranged in a filter casing 7 incorporated in an exhaust pipe such that the plates are opposed to each other in a direction of flows of exhaust gas 3, catalytic regenerative particulate filter 6 being received in a reception chamber 12 defined by and between the dispersion plates 10 and 11. A temperature sensor 14 is arranged in the filter casing 7 so as to detect exhaust temperature in the reception chamber 12, a sensing element 15 of the temperature sensor 14 being adapted to be in one of flows of the exhaust gas 3.

12 Claims, 6 Drawing Sheets

EXHAUST EMISSION CONTROL DEVICE

TECHNICAL FIELD

The present invention relates to an exhaust emission control device.

BACKGROUND ART

Particulates or particulate matter from a diesel engine is mainly constituted by carbonic soot and a soluble organic fraction (SOF) of high-boiling hydrocarbon and contains a trace of sulfate (misty sulfuric acid fraction). In order to suppress such kind of particulates from being discharged to atmosphere, it has been carried out as shown in FIG. 1 that a particulate filter 6 is incorporated in an exhaust pipe 4 through which exhaust gas 3 from a diesel engine 1 flows.

In the example shown, exhaust gas 3 discharged from an automobile's diesel engine 1 (internal combustion engine) via an exhaust manifold 2 flows through an exhaust pipe 4 with a muffler 5 which receives therein catalytic regenerative particulate filter 6 integrally carrying oxidation catalyst, the particulate filter 6 being encased by a filter casing 7 which forms an outer cylinder of the muffler 5.

More specifically, as shown in enlarged scale in FIG. 2, the muffler 5 has inlet and outlet pipes 8 and 9 between which is secured a required size of reception chamber 12 defined by and between dispersion plates 10 and 11 and with a number of communicating holes 10a and 11a, respectively. The particulate filter 6 is in the reception chamber 12.

As schematically shown in section in FIG. 3, the particulate filter 6 is constituted by a porous honeycomb structure made of ceramics and having lattice-like compartmentalized passages 6a; alternate ones of the passages 6a have plugged inlets and the remaining passages 6a with unplugged open inlets are plugged at their outlets. Thus, only the exhaust gas 3 passing through thin porous walls 6b compartmentalizing the respective passages 6a is discharged downstream.

The particulates, which are captured by and accumulated on inner surfaces of the walls 6b, require to be appropriately burned off so as to regenerate the particulate filter 6 before exhaust resistance increases considerably due to clogging. However, the exhaust gas from the diesel engine in a normal operating status rarely has a chance to reach a temperature level at which the particulates spontaneously ignite. Thus, catalytic regenerative particulate filter 6 integrally carrying oxidation catalyst has been developed for practical use, said oxidation catalyst being for example platinum-alumina catalyst added with an appropriate amount of rare-earth element such as cerium.

Adoption of such catalytic regenerative particulate filter 6 accelerates oxidation reaction of the captured particulates to lower their ignition temperature, so that the particulates can be burned off at an exhaust temperature lower than ever before.

However, even if such catalytic regenerative particulate filter 6 is adopted, an accumulated particulate amount may exceed a treated particulate amount in an operation region with lower exhaust temperature. When such operation status with lower exhaust temperature continues, there may be a fear that regeneration of the particulate filter 6 does not proceed well, disadvantageously resulting in excessive capturing of particulates by the particulate filter 6. In order to overcome this, it has been considered that, when the accumulated particulate amount becomes increased, fuel is added to the exhaust gas 3 upstream of the particulate filter 6 so as to forcibly regenerate the filter 6.

More specifically, addition of the fuel upstream of the particulate filter 6 causes the added fuel to effect oxidation reaction on the oxidation catalyst of the filter 6; reaction heat generated therefrom increases the catalyst floor temperature to burn off the particulates, thereby regenerating the particulate filter 6.

This kind of forcible regeneration of the particulate filter 6 is disclosed, for example, in the following References 1 and 2.
[Reference 1] JP2003-155915A
[Reference 2] JP2003-222040A In an exhaust emission control device as shown in FIG. 4 which includes a flow-through type oxidation catalyst 13 (see FIG. 5) upstream of the particulate filter 6 in the reception chamber 12 so as to especially accelerate the oxidation reaction of the captured particulates, the added fuel is oxidized at the oxidation catalyst 13 upstream of the particulate filter 6 to generate reaction heat; the exhaust gas 3 elevated in temperature by the reaction heat is introduced into the particulate filter 6. Thus, forcible regeneration of the particulate filter 6 can be accomplished even at further lower exhaust temperature.

JP 2003/214136 describes an exhaust emission control device in which a particulate filter is mounted in the middle of an exhaust pipe, an oxidation catalyst layer is carried on a surface which is in contact with an exhaust gas in sheet metal parts forming a flowing space of the exhaust gas at a more upstream side than the particulate filter.

JP 2003/106139 describes an exhaust emission control device in which a catalyst-regenerative type particulate filter is provided in a filter case installed in the middle of an exhaust pipe, a distribution board having a large number of communication holes is opposedly arranged close to the inlet-side end face of a particulate filter in the filter case and a part of a communication holes of a distribution board is formed in the bell mouth shape whose diameter is gradually decreased toward the inlet side at face of the particulate filter to be a nozzle part for throttling the flow of an exhaust gas.

SUMMARY OF THE INVENTION

Problems to be Solved by the Invention

For forcible regeneration of the particulate filter 6 through this kind of fuel addition, a temperature sensor is attached to the filter casing 7 to detect inner temperature of the reception chamber 12, and regeneration control is conducted on the basis of temperature detected by the temperature sensor. However, upon attachment of such temperature sensor on the filter casing 7 incorporated in the exhaust pipe 4, conventionally, consideration has been taken only to the facts that interference with surrounding structures is averted and that a minimum height above ground (clearance between roadbed and a lowermost part of chassis mechanism: load clearance) is ensured; actually, no specific consideration has been taken as to position of a sensing element of the temperature sensor within the filter casing 7.

Thus, for example as shown in FIG. 6, if a sensing element 15 of the temperature sensor 14 inserted into the reception chamber 12 near the inlet-side dispersion plate 10 happens to get behind a wall portion between the communicating holes 10a on the dispersion plate 10, the sensing element 15 of the sensor 14 is not exposed to any flow of the exhaust gas 3, which may cause lowering of accuracy in temperature sensing especially at a lower flow rate of the exhaust gas 3, failing to accurately conduct the regeneration control of the particulate filter 6.

The invention was made in view of the above and has its object to enhance sensing accuracy of a temperature sensor so as to accurately conduct regeneration control of a particulate filter.

Means or Measures for Solving the Problems

The invention is directed to an exhaust emission control device wherein a pair of dispersion plates with a number of communicating holes are arranged in a filter casing incorporated in an exhaust pipe such that the plates are opposed to each other in a direction of flows of exhaust gas, a catalytic regenerative particulate filter being received in a reception chamber defined by and between the dispersion plates, characterized in that a temperature sensor is fitted to the filter casing so as to detect exhaust temperature in the reception chamber, a sensing element of the temperature sensor being adapted to be in a flow of the exhaust gas.

Thus, the sensing element of the temperature sensor is always exposed to the exhaust gas flow, so that sensing accuracy of the temperature sensor is enhanced to thereby attain accurate regeneration control of the particulate filter.

In one example of the inventive exhaust emission control device, the sensing element of the temperature sensor is arranged just behind one of the communication holes of the inlet-side dispersion plate and/or just before one of the communicating holes of the outlet-side dispersion plate. Further, in a case where oxidation catalyst is arranged upstream of the particulate filter within the reception chamber, a further sensing member of the temperature sensor may be arranged in a flow of the exhaust gas between the oxidation catalyst and the particulate filter.

Effects of the Invention

According to an exhaust emission control device of the invention, the sensing element of the temperature sensor can be always exposed to a flow of the exhaust gas, which advantageously results in excellent effect that sensing accuracy of the temperature sensor can be substantially enhanced in comparison with the prior art and thus the regeneration control of the particulate filter can be accurately conducted.

Best Mode for Carrying Out the Invention

Embodiments of the invention will be described in conjunction with the drawings.

Embodiment 1

FIGS. 7 and 8 show an embodiment of the invention in which parts similar to those in FIGS. 1-6 are designated by the same reference numerals.

As shown in FIG. 7, in the embodiment, a pair of dispersion plates 10 and 11 with a number of communicating holes 10a and 11a, respectively, are arranged in a filter casing 7 incorporated in an exhaust pipe 4 such that the dispersion plates are opposed to each other in a direction of flows of the exhaust gas 3, catalytic regenerative particulate filter 6 being received in a reception chamber 12 defined by and between the dispersion plates 10 and 11, oxidation catalyst 13 being arranged in the reception chamber 12 and upstream of the particulate filter 6. A sensing element of the temperature sensor 14 is arranged in each of a position within the reception chamber 12 and adjacent to the inlet-side dispersion plate 10, a position within the reception chamber 12 and adjacent to the outlet-side dispersion plate 11 and a position between the oxidation catalyst 13 and the particulate filter 6.

More specifically as shown in enlarged scale in FIG. 8, the temperature sensor 14 in the reception chamber 12 adjacent to the inlet-side dispersion plate 10 has the sensing element 15 arranged just behind one of the communicating holes 10a of the dispersion plate 10. Similarly, the temperature sensor 14 in the reception chamber 12 adjacent to the outlet-side dispersion plate 11 has the sensing element 15 arranged just in front of one of the communicating holes 11a of the dispersion plate 11.

In FIG. 8, the sensing elements 15 of the temperature sensors 14 are arranged to correspond with the relatively larger-diameter communicating holes 10a and 11a surrounding connections to the inlet and exit pipes 8 and 9, respectively; alternatively, they may be arranged to correspond with the relatively smaller-diameter communicating holes 10a and 11a surrounding the connections to the inlet and exit pipes 8 and 9, respectively.

The temperature sensor 14 between the oxidation catalyst 13 and the particulate filter 6 has the sensing element 15 arranged in one of flows of the exhaust gas from the passages of the oxidation catalyst 13 to the passages 6a of the particulate filter 6.

Further specifically, according to the inventors knowledge obtained from various kinds of experiments, the exhaust gas flowing via a specific one of the communicating holes 10a of the inlet-side dispersion plate 10 into the reception chamber 12 always tends to form flow of the exhaust gas directed to a specific one of the communicating holes 11a on the outlet-side dispersion plate 11, so that predetermined flows of the exhaust gas 3 are formed between the oxidation catalyst 13 and the particulate filter 6, the sensing element 15 of the temperature sensor 14 being arranged in one of such flows of the exhaust gas.

With the thus constructed exhaust emission control device, the sensing elements 15 of the temperature sensors 14 are always exposed to flows of the exhaust gas 3, whereby sensing accuracy of the temperature sensors 14 are substantially enhanced in comparison with the prior art and thus regeneration control of the particulate filter 6 can be accurately conducted.

Embodiment 2

FIG. 9 shows a further embodiment applied to the dispersion plates of a type different from that shown in FIG. 8. The dispersion plates 10 and 11 shown have the inlet and exit pipes 8 and 9 arranged eccentrically due to layout relationship of the muffler 5 with surrounding structures, a number of relatively smaller-diameter communicating holes 10a and 11a being dispersed around connections to the pipes.

The temperature sensor 14 positioned in the reception chamber 12 and adjacent to the inlet-side dispersion plate 10 has the sensing element arranged just behind a relatively larger-diameter communicating hole 10a among the communicating holes 10a on the dispersion plate 10; similarly the temperature sensor 14 in the reception chamber 12 adjacent to the outlet-side dispersion plate 11 has the sensing element 15 just in front of a relatively larger-diameter communicating hole 11a among the communicating holes 11a on the dispersion plate 11. Such embodiment applied to this kind of dispersion plates 10 and 11 can have effects and advantages similar to those in the above-mentioned embodiment.

INDUSTRIAL APPLICABILITY

It is to be understood that an exhaust emission control device of the invention is not limited to the above-mentioned embodiments and that various changes and modifications may be made without leaving the gist of the invention. For example, the communicating holes on the outlet-side dispersion plate may be provided with inner pipes for enhancing the silencing effect.

Figure 1:
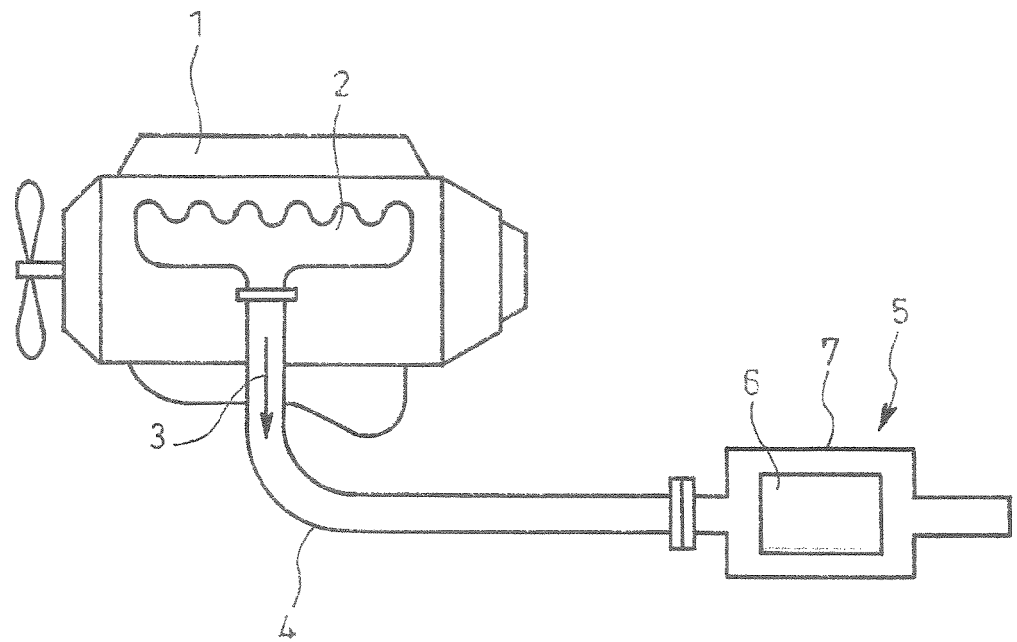
[FIG. 1] A schematic view showing a whole structure of a conventional exhaust emission control device.
Figure 2:
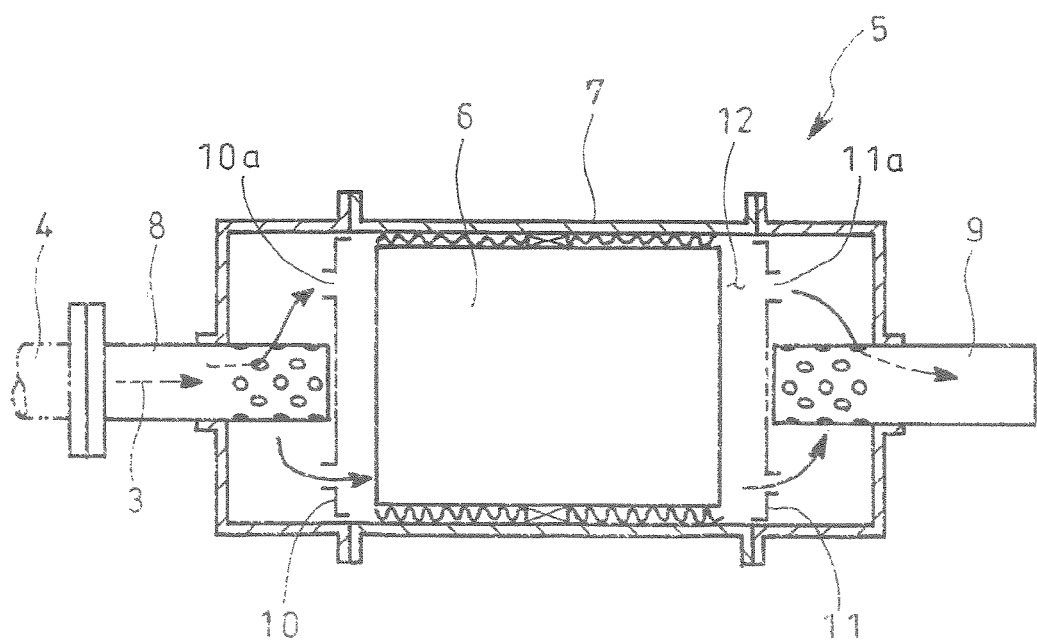
[FIG. 2] A sectional view showing particulars of an inner structure of the muffler shown in FIG. 1.
Figure 3:
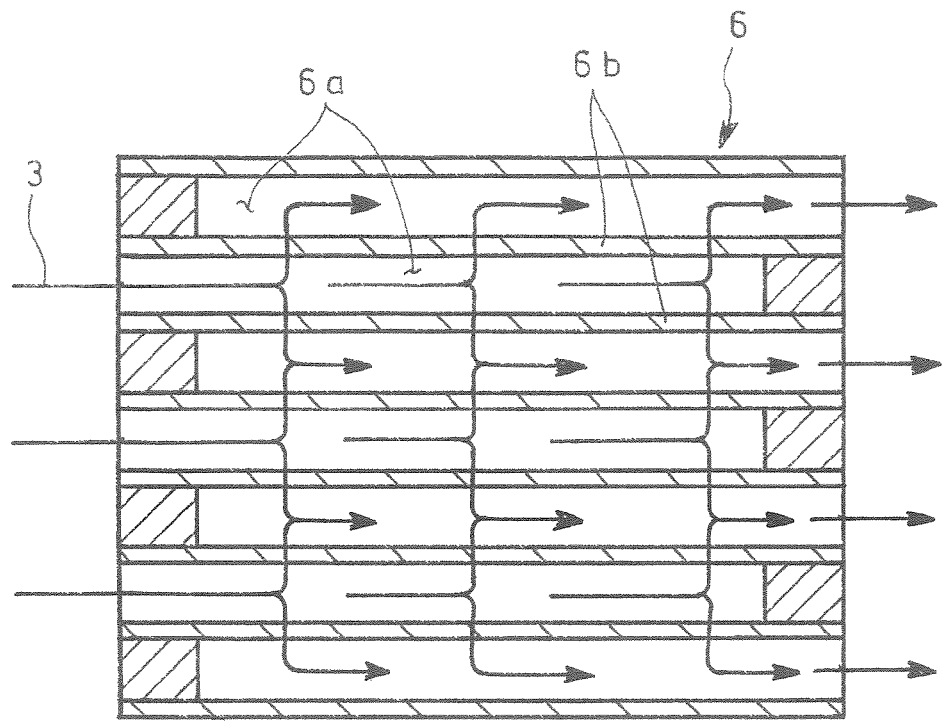
[FIG. 3] A sectional view schematically showing a structure of the particulate filter shown in FIG. 2.
Figure 4:
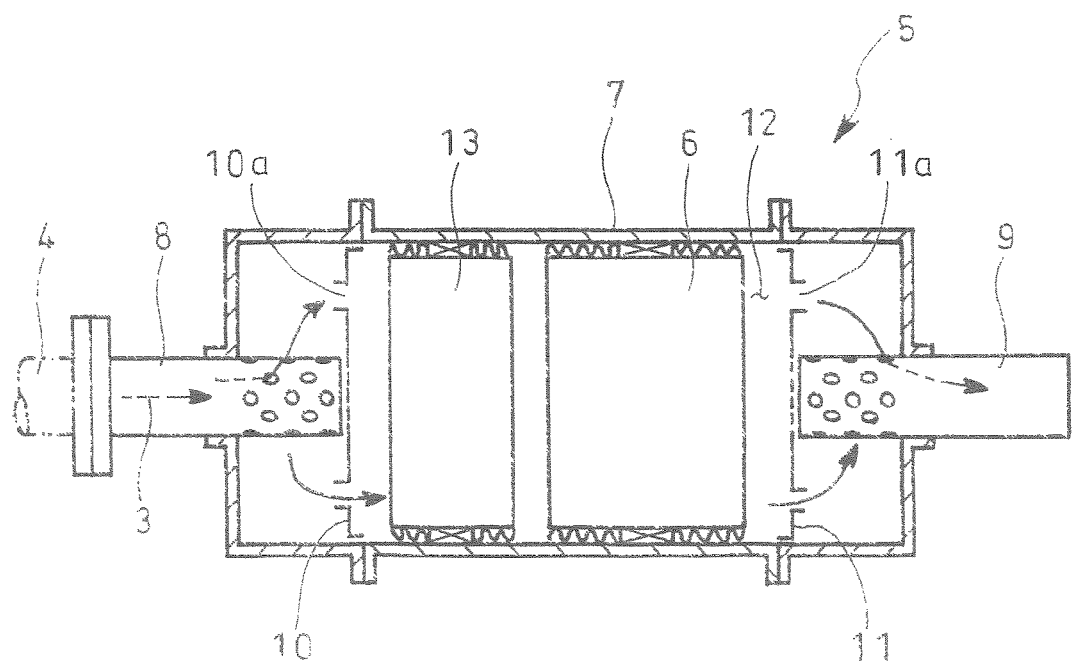
[FIG. 4] A sectional view showing an arrangement with oxidation catalyst upstream of the particulate filter.
Figure 5:
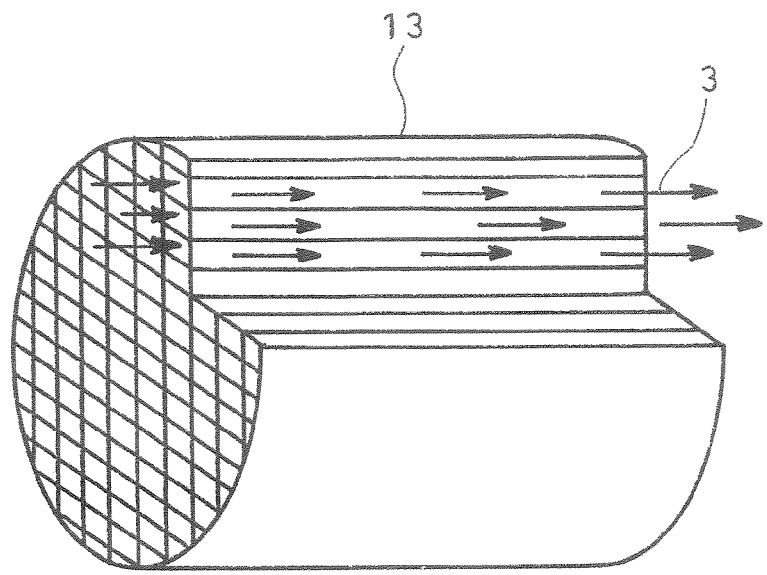
[FIG. 5] A perspective view partly cut out for schematically showing the structure of the oxidation catalyst shown in FIG. 4.
Figure 6:
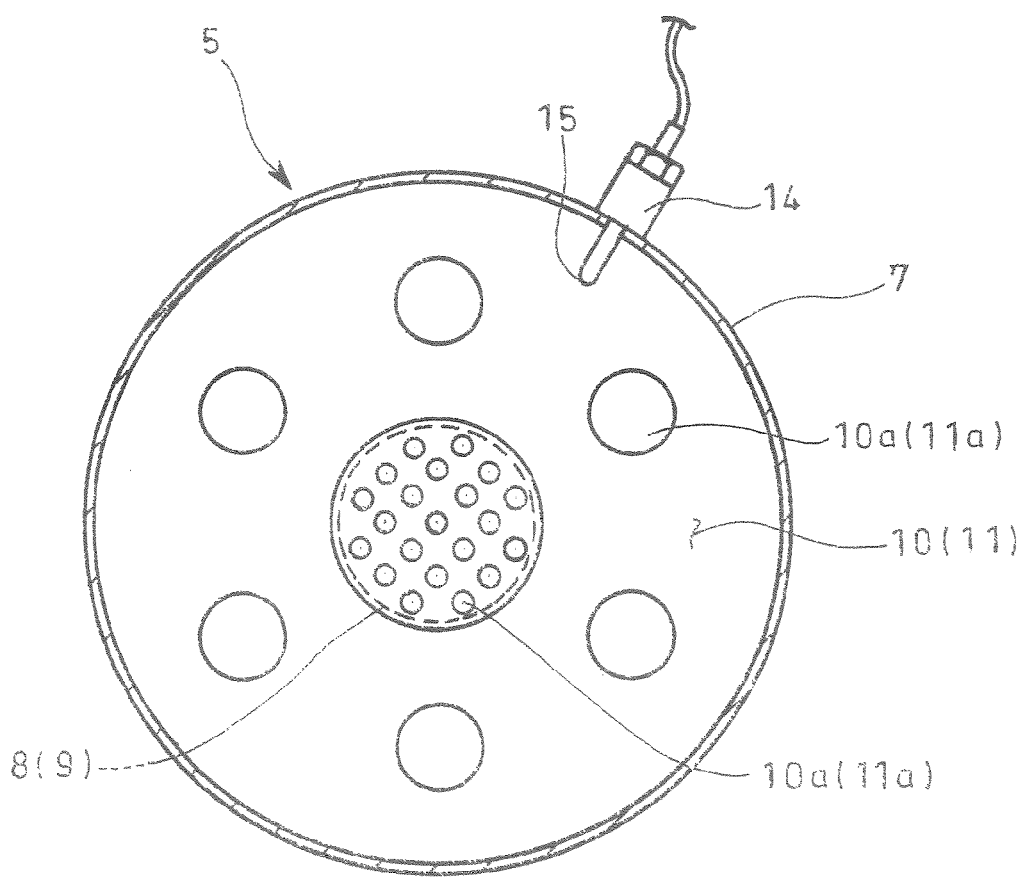
[FIG. 6] A front view showing position relationship between the dispersion plate and the sensing element of the temperature sensor shown in FIG. 4.
Figure 7:
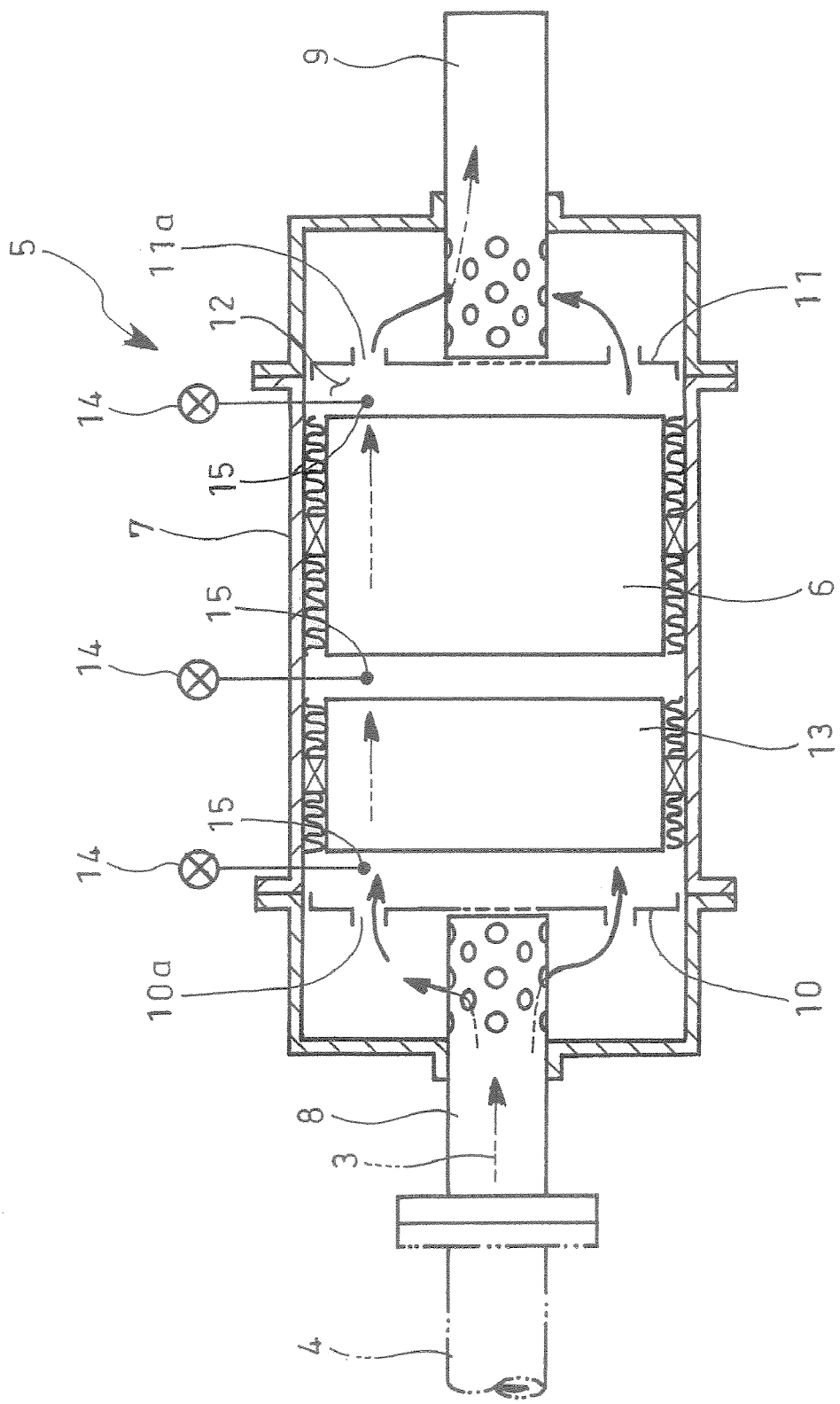
[FIG. 7] A sectional view showing an embodiment of the invention.
Figure 8:
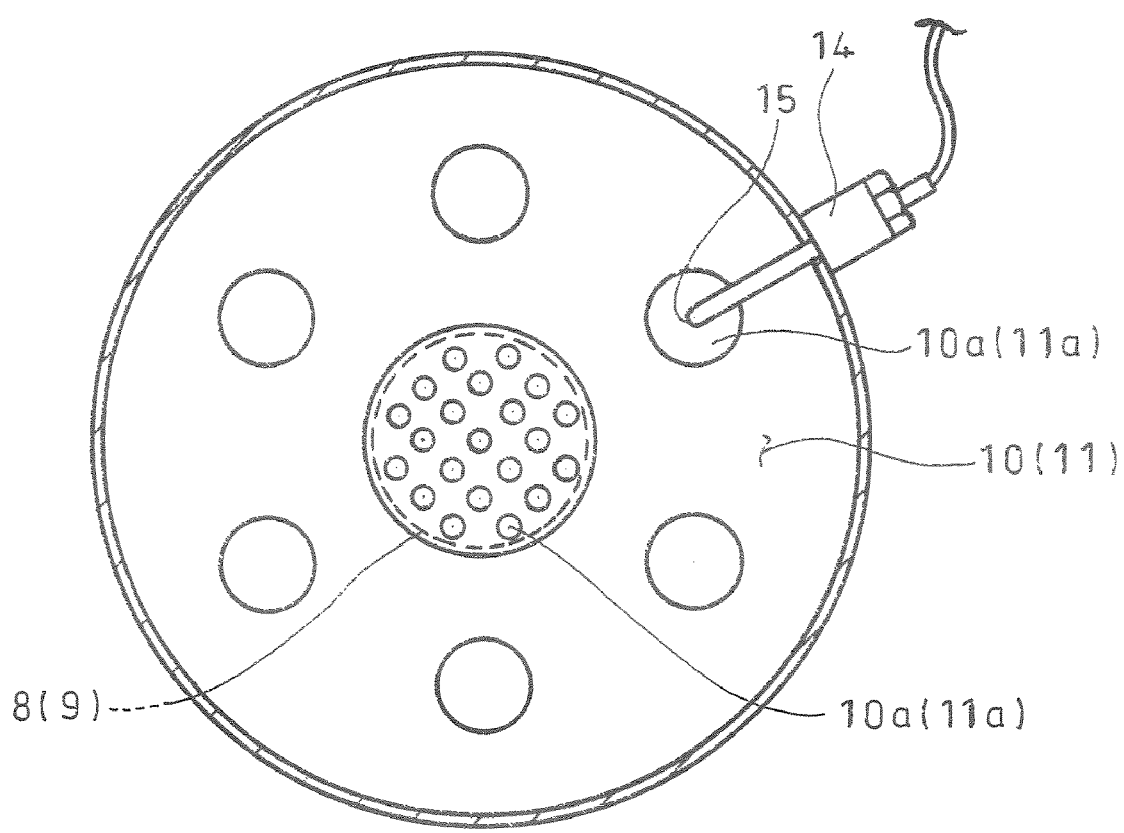
[FIG. 8] A front view showing position relationship between the dispersion plate and the sensing element of the temperature sensor shown in FIG. 7.
Figure 9:
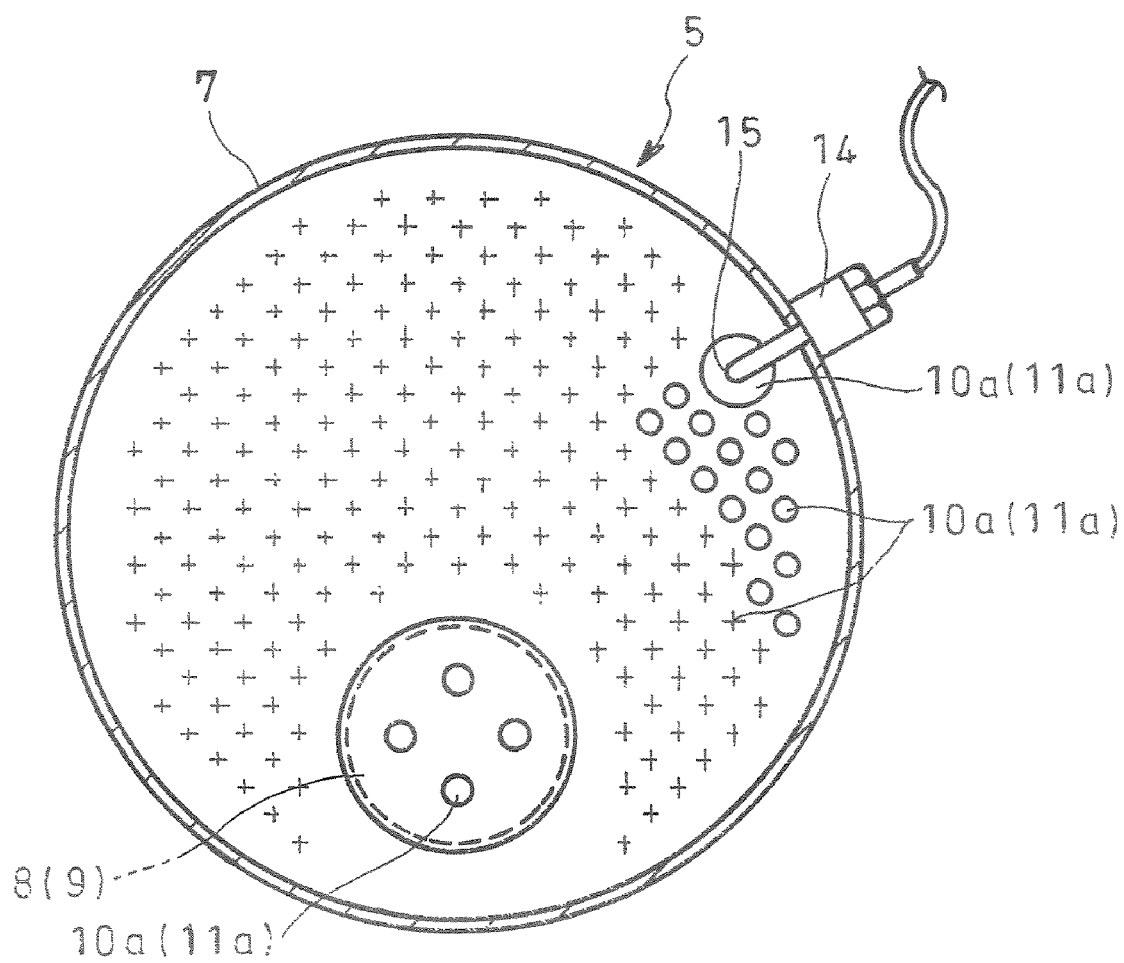
[FIG. 9] A front view showing application to the dispersion plates of a type different from that of FIG. 8.

EXPLANATION OF THE REFERENCE NUMERALS 3 exhaust gas
4 exhaust pipe
6 particulate filter
7 filter casing
10 dispersion plate
10a communicating hole
11 dispersion plate
11a communicating hole
12 reception chamber
13 oxidation catalyst
14 temperature sensor
15 sensing element

The invention claimed is:

1. An exhaust emission control device comprising:
  first and second dispersion plates, each including a plurality of communicating holes, said dispersion plates arranged in a filter casing incorporated in an exhaust pipe such that the plates are opposed to each other in a direction of flow of exhaust gas,
  a catalytic regenerative particulate filter being received in a reception chamber defined by and between the first and second dispersion plates,
  a temperature sensor fitted to the filter casing so as to detect exhaust temperature in the reception chamber, and
  a sensing element of the temperature sensor positioned to be in a flow of the exhaust gas,
  wherein the first dispersion plate is disposed on a first side of the particulate filter closer to an inlet than is the second dispersion plate,
  wherein the second dispersion plate is disposed on a second side of the particulate filter opposite the first side, and
  wherein the sensing element is disposed
    between the first dispersion plate and the particulate filter, and directly behind one of the communicating holes in the first dispersion plate, or
    between the second dispersion plate and the particulate filter, and directly in front of one of the communicating holes in the second dispersion plate.

2. The exhaust emission control device as claimed in claim 1, wherein a first sensing element of a temperature sensor is disposed between the first dispersion plate and the particulate filter, directly behind one of the communicating holes of the first dispersion plate, and
  wherein a second sensing element of a temperature sensor is disposed between the second dispersion plate and the particulate filter, directly in front of one of the communicating holes of the second dispersion plate.

3. The exhaust emission control device as claimed in claim 1, wherein an oxidation catalyst is arranged in the reception chamber and upstream of the particulate filter, and a further sensing element of the temperature sensor is disposed in one of flows of the exhaust gas between the oxidation catalyst and the particulate filter.

4. The exhaust emission control device as claimed in claim 2, wherein an oxidation catalyst is arranged in the reception chamber and upstream of the particulate filter, and a third sensing element of the temperature sensor is arranged in a path of the exhaust gas between the oxidation catalyst and the particulate filter.

5. The exhaust emission control device as claimed in claim 1, wherein an axis of the inlet pipe is aligned with an axis of the first dispersion plate.

6. The exhaust emission control device as claimed in claim 1, wherein an axis of the outlet pipe is aligned with an axis of the second dispersion plate.

7. The exhaust emission control device as claimed in claim 1, wherein an axis of the inlet pipe is not aligned with an axis of the first dispersion plate.

8. The exhaust emission control device as claimed in claim 1, wherein an axis of the outlet pipe is not aligned with an axis of the second dispersion plate.

9. The exhaust emission control device as claimed in claim 1, wherein the sensing element is disposed between the first dispersion plate and the particulate filter, and directly behind one of the communicating holes in the first dispersion plate, wherein the communicating hole in the first dispersion plate directly in front of the sensing element is aligned with a communicating hole in the second dispersion plate in the direction of flow of exhaust gas.

10. The exhaust emission control device as claimed in claim 1, wherein the sensing element is disposed between the second dispersion plate and the particulate filter, and directly in front of one of the communicating holes in the second dispersion plate, wherein the communicating hole in the second dispersion plate directly behind the sensing element is aligned with a communicating hole in the first dispersion plate in the direction of flow of exhaust gas.

11. The exhaust emission control device as claimed in claim 2, wherein the first and second sensing elements are aligned with each other in the direction of flow of exhaust gas.

12. The exhaust emission control device as claimed in claim 4, wherein the first, second, and third sensing elements are aligned with each other in the direction of flow of exhaust gas.

* * * * *